(12) United States Patent
Zhang

(10) Patent No.: US 8,120,884 B2
(45) Date of Patent: Feb. 21, 2012

(54) REVERSE VOLTAGE PROTECTION CIRCUIT

(75) Inventor: Weibiao Zhang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 67 days.

(21) Appl. No.: 12/702,699

(22) Filed: Feb. 9, 2010

(65) Prior Publication Data

US 2011/0195744 A1    Aug. 11, 2011

(51) Int. Cl.
*H02H 9/00* (2006.01)
*H01C 7/12* (2006.01)
*H02H 1/00* (2006.01)
*H02H 1/04* (2006.01)
*H02H 3/22* (2006.01)
*H02H 9/06* (2006.01)

(52) U.S. Cl. .......................................... 361/56; 361/118
(58) Field of Classification Search ...................... 361/56
See application file for complete search history.

(56) References Cited

U.S. PATENT DOCUMENTS 7,453,268 B2 * 11/2008 Lin .............................. 324/608
7,719,242 B2 *  5/2010 Negoro ......................... 323/273

* cited by examiner

*Primary Examiner* — Dharti Patel
(74) *Attorney, Agent, or Firm* — William B. Kempler; Wade J. Brady, III; Frederick J. Telecky, Jr.

(57) ABSTRACT

A voltage protection circuit that has a protection transistor coupled between a voltage supply pin of an integrated circuit and a voltage output terminal of the integrated circuit. A biasing circuit is coupled to a control node of the protection transistor and configured to cause the protection transistor to turn on to form a low impedance path between the voltage supply pin and the voltage output terminal when a positive supply voltage is coupled to the voltage supply terminal and to cause the protection transistor to turn off when a negative supply voltage is coupled to the voltage supply terminal. An electro-static discharge (ESD) protection circuit may also be connected between the voltage supply pin and a reference node that is configured to conduct a negative static discharge current for period of time, and to not conduct a negative current continuously.

18 Claims, 8 Drawing Sheets

1

REVERSE VOLTAGE PROTECTION CIRCUIT

FIELD OF THE INVENTION

This invention generally relates to integrated circuits that are routinely connected to a source of power.

BACKGROUND OF THE INVENTION

During the normal course of use for many systems, a source of power will be removed and reconnected over time. Each time the power is reconnected, there may be an opportunity to connect the power improperly. For example, in battery powered applications, a battery may be inserted backwards. In rechargeable systems, a battery charger may be connected incorrectly, or a non-compatible battery charger may be connected. In other systems, a power supply component may be connected to the system incorrectly. A reverse battery, battery charger or power supply connection is dangerous because parasitic diodes of the internal circuits and even ESD (Electronic Static Discharge) circuits can be forward biased and draw a large current. These large currents may damage the ESD structures and internal circuits. Circuits that limit the reverse current in order to protect the on-chip circuits as well as ESD circuits are typically located off-chip as shown in FIG. 1.

Integrated circuit (IC) 100 includes functional circuitry 102 that is protected by ESD circuits at each pin, such as ESD circuit 104. An off-chip circuit 112 protects the IC when a high reverse voltage is inadvertently connected to supply voltage pin (VDD) 110. In this example, the protection circuit is a simple resister. The higher the resistance of resistor R, the better the protection effect will be since reverse current is limited to a lower value by the resistor. However, when the impedance of R is large, the normal current that the normal connection can provide is limited. For example, assume R=10K, VDD=40V normally or −40V if reversely connected. The ESD protected pin 106 is clamped to about −0.6V when reverse connected. This value may vary depending on the structure and process parameters for IC 100. The reverse current is −0.6V−(−40)V/10 k=3.94 mA. In normal condition, when VDD=40V, voltage in input pin 106 would also be limited by resistor R based on current; 40V−10K*I. In order to keep the internal power level above 2V, for example, then Imax would be 3.8 mA. This is not good for many applications.

Another way is to place a diode shown as FIG. 2A in protection circuit 212. The voltage drop from VDD to the voltage supply pin 106 is determined by the diode forward voltage. The forward impedance is small. But the voltage drop of the diode becomes a larger portion of lower values of VDD. For example, when VDD=2V, diode voltage drop=0.6V, internal power supply voltage at pin 106 is limited to 1.4V, assuming the current load is not too high and the diode area is reasonably large. The above method requires the diode to survive high reverse bias voltage.

A better way may be to place a diode in parallel to the resistor shown as FIG. 2B in protection circuit 222. The voltage drop from VDD to the voltage supply pin 106 is determined by the R value, the diode area, diode forward clamp voltage and the current load. The forward impedance is smaller than that in FIG. 1. But there is still a limitation of the voltage drop due to the diode. As VDD is reduced, the diode voltage drop of around 0.6V becomes a larger portion of VDD. For example, VDD=2V, voltage drop=0.6V, internal power supply voltage at pin 106 is limited to 1.4V, assuming the current load is not too high and the diode area is reason-

2 ably large. The above method also requires the diode to survive high reverse bias voltage.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
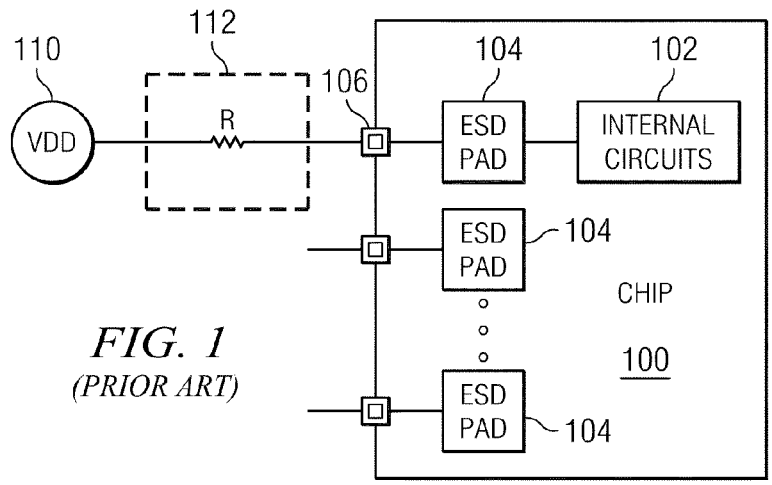
FIG. 1 is a schematic diagram of a prior art voltage protection circuit.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In some applications, variations in VDD may be large, for example, a system that is connected to a battery charger may experience VDD ranging from 2V to 40V. In these applications, both of the methods shown in FIG. 1 and FIG. 2 have serious limitations. When VDD is positive but low, the impedance of the protection circuits is not low enough for a high current load. FIG. 3 shows a protection circuit 300 that can be implemented on-chip to support the reverse protection and provide high current load due to its low impedance when VDD is positive.

In FIG. 3, voltage supply pin 302 receives a VDDPIN voltage from an external power supply, such as a battery, battery charger, or other type of power supply. Protection circuit 310 provides low insertion impedance when the VDDPIN power source is correctly connected and provides high voltage blocking when the VDDPIN power source is reverse connected. A safe voltage level is then provided to the functional circuitry 330 in the rest of the IC via internal VDDINT point 304. PMOS transistor M1 has a large W/L (width to length) ratio to provide low impedance while it is ON. A zener diode ZD is used to clamp the voltage of the M1's drain-to-gate voltage in order not to surpass the maximum operation voltage. R2 limits the current drawn from VDDPIN pin 302 when it is positive. Diode D1 is used to isolate the current from ground to VDDPIN when VDDPIN is negative. Diode D1 may be implemented as an explicit diode, or as a diode-connected drain extended PMOS transistor such as M5 or M6, for example. R1 is a resistor to limit current from ground to VDDPIN through a parasitic diode of diode D1 between ground to node N0 (if any) when VDDPIN is reversely connected to a negative voltage. ESD (Electronic Static Discharge) protection functions are provided by the normal ESD protection block ESD1 322 and by ESD circuit 320, that includes C1, R3, R4, and M2~M6.

During normal operation, a positive voltage is applied to VDDPIN pin 302. When the voltage is a positive voltage larger than Zener diode ZD's breaking voltage, transistor M1 is ON while its drain-to-gate voltage (VGD) is close to the clamped voltage Vzd. The zener voltage may be process dependent; in this example assume the zener voltage is 7V. If VDDPIN is lower than Vzd, for example 2V, then gate voltage VG is close to 0V because little current is flowing through resistor R2; transistor M1 is also ON because VDG>|VTP|, where VDG is the drain-to-gate voltage of M1, and VTP is the threshold voltage of PMOS M1. Transistor M1 is chosen to have a large W/L ratio in order to have low impedance. The size of M1 may be limited by real estate constraints on the IC. In one embodiment, M1 has a width to length ratio of approximately 10,000 and achieves an ON resistance of less than one ohm.

When VDDPIN is incorrectly connected in reverse, for example, VDDPIN=−2V or −40V, transistor M1 gate voltage VG is close to ground. Transistor M1 is off since VSG<|VTP|, where VSG is the source-to-drain voltage of M1. In some linear BiCMOS processes, transistor M1's source-to-drain voltage can be very high. So even if the VSD is high, transistor M1 still survives. Diode D1 prevents current from bypassing transistor M1.

Thus, biasing circuitry R1, D1, ZD and R2 is configured to cause protection transistor M1 to turn on in a low impedance manner when a positive supply voltage is coupled to the voltage supply terminal 302 and to cause the protection transistor to turn off when a negative supply voltage is coupled to the voltage supply terminal. In this embodiment, R1=10 Kohm, and R2=1 Mohm. Other values may be selected based on various process parameters and operating parameters.

Figure 4:
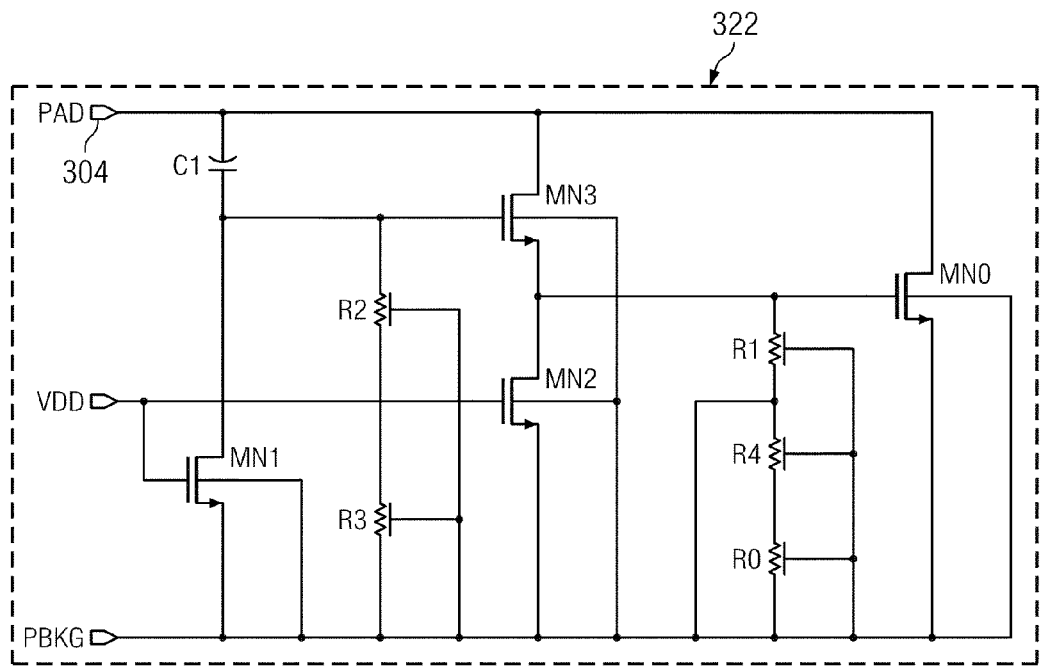
FIG. 4 is a schematic of an ESD circuit.

When the protection circuit is implemented onchip, ESD protection should be included. In this embodiment, a traditional ESD circuit 322 is connected to the internal VDDINT point 304. FIG. 4 is a schematic of ESD circuit 322. NMOS devices used in ESD structures typically include parasitic diodes that may become forward biased when the protected pin is connected to a negative voltage and therefore conduct a large current if a reversed power supply is connected to the pin. For example, in FIG. 4, NMOS devices MN0 and MN3 may have parasitic diodes from source to drain. Therefore, if point 304 is connected to a negative voltage, there would be a sneak path and a large damaging current may flow. In this embodiment, since ESD protection circuit 322 is connected to internal VDDINT point 304, reverse protection circuit 320 prevents point 304 from conducting a large current through the parasitic diodes within ESD circuit 322.

An additional reverse voltage tolerant ESD circuit 320 is connected to voltage supply pin 302. Given a human body model example, when VDDPIN 302 is stressed by a 2000V positive pulse, transistor M1 is ON, and ESD1 322 is ON so that it will conduct a quick current dump to ground. When VDDPIN 302 is stressed by a −2000V short pulse, C1 coupling will pull down node N2 quickly, so that transistor M2 is ON and pull down node N3 quickly as well and thereby turn on transistor M3 too. Thus, when transistors M2 and M3 are ON, a quick current will draw from ground through M3 and M4 in order to maintain VDDPIN 302 from going too negative. The W/L ratio of M3, and M4 needs to be chosen reasonably large. In this embodiment, M3 and M4 have a W/L ratio of approximately 2500. Devices M5 and M6 are diode-connected, however, they may be embodied as explicit diodes as well. They provide a conducting path between ground to the gates of M2 and M3 and charge up capacitor C1. After a period of time, the gate voltage of M2 and M3 are pulled close to ground, and they are turned off. In this manner, they do not conduct a damaging current when a negative power source is connected to voltage input pin 302. M4, M5, M6 also block the leakage current from VDDPIN 302 to GND when VDDPIN 302 is a normal positive voltage (2V~40V for example). In this embodiment, R3=2 Mohm, R4=2 Mohm, and C=2 pF. Other values may be selected based on various process parameters and operating parameters.

Using the above circuits, voltage on voltage supply pin 302 is controlled within the device operating range during ESD strikes. In summary, the normal ESD structure ESD1 322 plus the additional ESD circuit 320 provide ESD protection to transistor M1 as well as the internal circuits 330 that are connected to the VDDINT terminal 304.

Test Results

Figure 5:
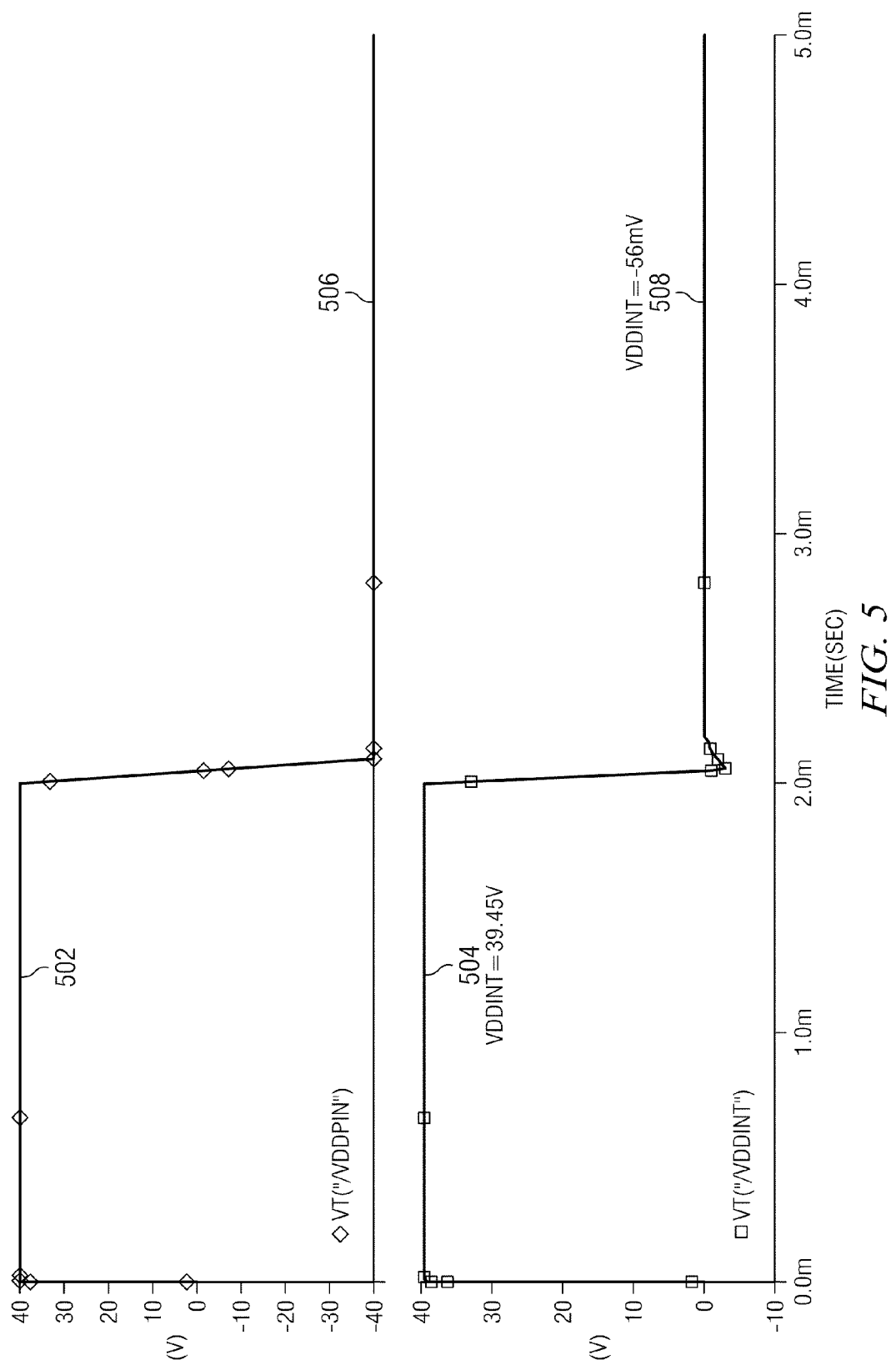
FIG. 5 is a plot illustrating operation of the protection circuit of FIG. 3.

A test circuits has been constructed using a linear BiCMOS (bipolar junction transistor and CMOS) process that can produce channel lengths down to 0.35 um and breakdown margins of at least 40 volts. FIG. 5 shows how the VDDINT voltage on internal distribution point 304 behaves when +/−40V voltage is applied to the VDDPIN. In this test chip, VDDINT is loaded with a 100 Ohm resistor to simulate functional circuitry 330. When VDDPIN is 40V as indicated at 502, then VDDINT=39.45V as indicated at 504. The impedance is 0.55V/0.3945=1.4 Ohm. When VDDPIN is −40V, as indicated at 506, then VDDINT is close to 0V, as indicated at 508.

Figure 6:
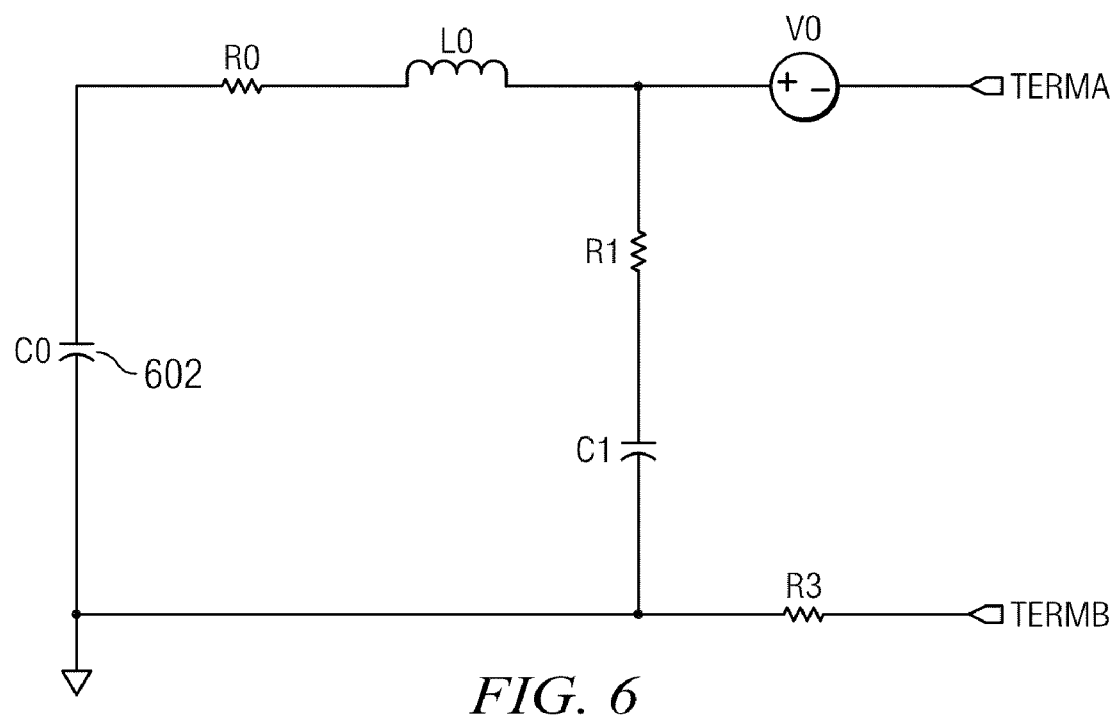
FIG. 6 is a schematic of a prior art Human Body Model used for testing the protection circuit of FIG. 3.

FIG. 6 is a schematic of a Human Body Model used for testing the protection circuit. ESD stress simulation is done using HBM (Human-Body-Model). 100 pF capacitor 602 is initialized to be +/−2000V at time 0, then the charge is applied to the plus and minus terminals of the circuit under test through an RLC network as shown in FIG. 6.

Figure 7:
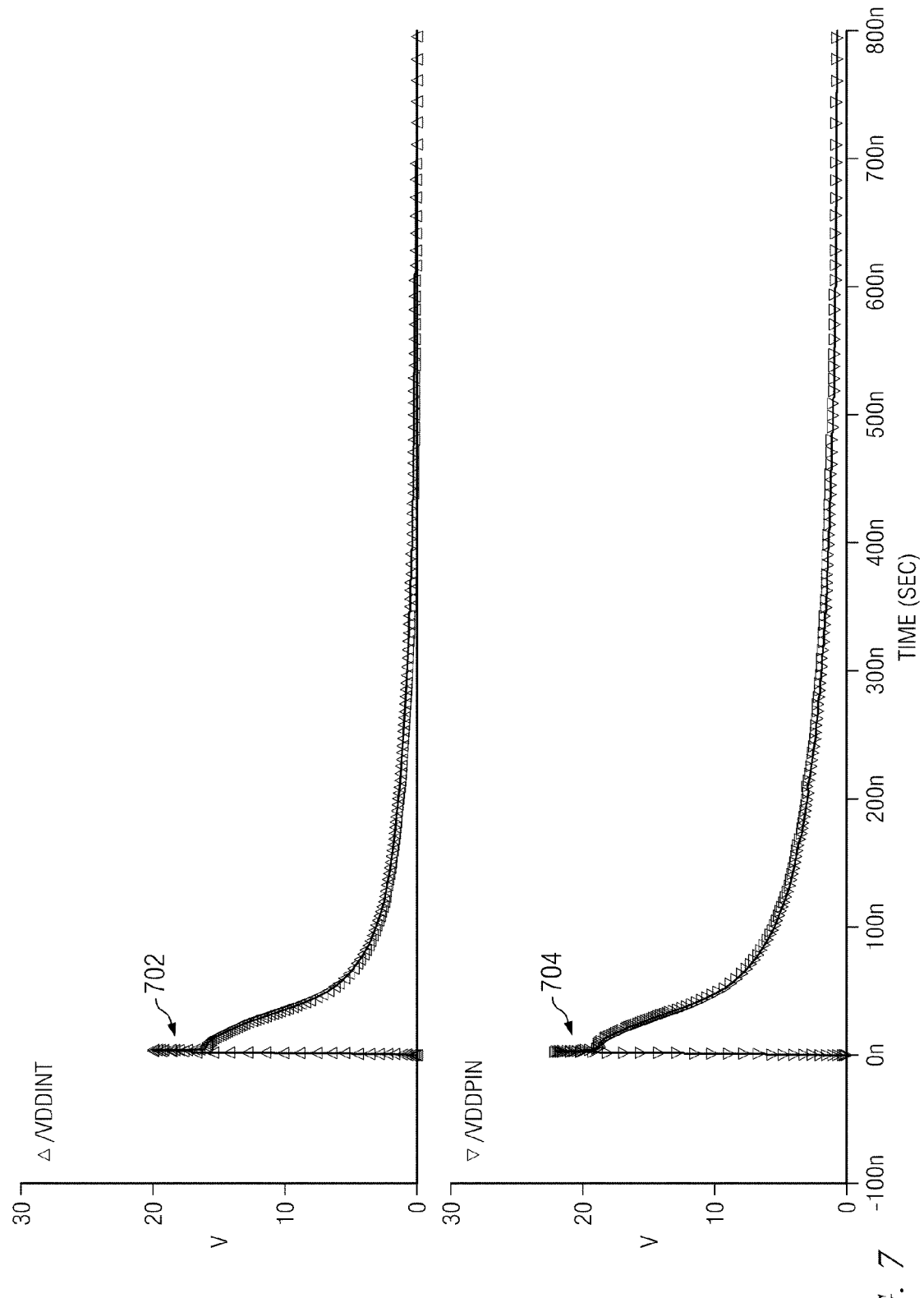
FIG. 7 is a plot illustrating operation of the protection circuit of FIG. 3 under 2000 volt ESD stress.

FIG. 7 is a plot illustrating operation of the test chip with the protection circuits of FIG. 3 under a 2000V positive ESD stress. The peak voltage of supply pin 302 as indicated at 702 and the peak voltage of internal distribution terminal 304 as indicated at 704 are both close to 20V, which is safe with adequate margin for the 40V devices that were chosen for the test chip.

Figure 8:
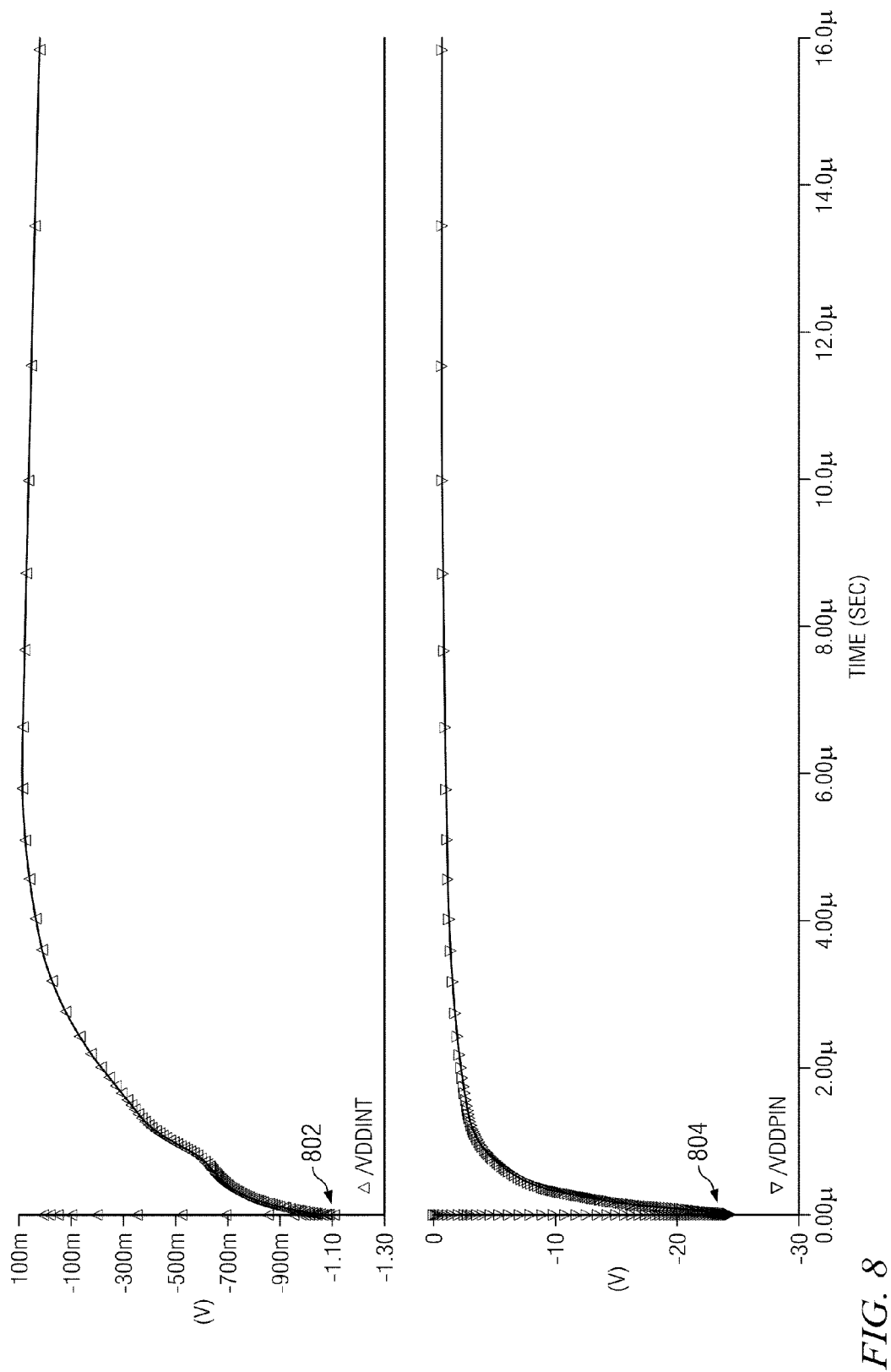
FIG. 8 is a plot illustrating operation of the protection circuit of FIG. 3 under −2000 volt ESD stress.

FIG. 8 is a plot illustrating operation of the test chip with the protection circuits of FIG. 3 under a −2000V negative ESD stress. The peak voltage of supply pin 302 as indicated at 802 glitches down to minimum of −24V which is safe for −40V devices with good margin. The peak voltage of internal distribution terminal 304 as indicated at 804 glitches down to only −1.1V.

Figure 9:
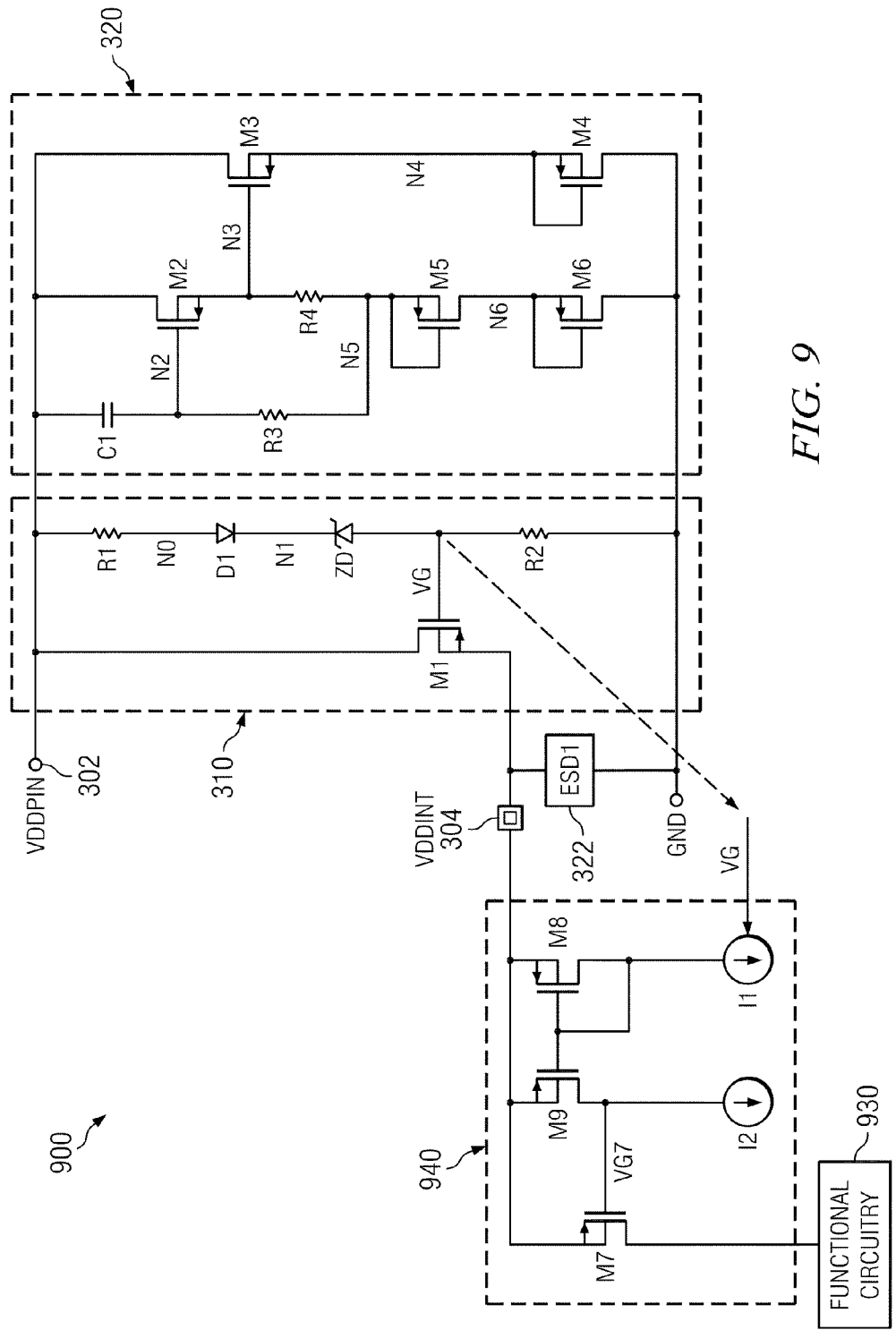
FIG. 9 is a schematic diagram of another embodiment of the protection circuit of FIG. 3.

FIG. 9 is a schematic diagram of another embodiment of the protection circuit of FIG. 3. Embodiments of the protection circuits describe herein may be used for nearly any IC to protect against a reverse voltage connection. Various other functions can be based on this block. A sense circuit 940 may be added to sense when the VDDINT is too high (positive) to cut off the path from VDDINT to some internal circuits as well. In addition to the reverse protection, it will protect against +/−voltages. For example, in the exemplary embodiment of FIG. 9, it will protect against negative −40V, and cut off when VDDPIN>7V, for example, to protect against over voltage.

In a first example in which the over voltage protection threshold is not required to be vary accurate, sense circuit 940 includes MOS transistor M7 that is added between VDDINT and functional circuitry 930. When VDDPIN is positive and higher than the voltage drop across zener diode ZD, gate voltage VG will be positive. If the VDDPIN >7V and Zener diode is clamping the voltage to 7V, then VG goes up further since ZD voltage is fixed to be 7V. Gate voltage VG can be used to generate a current I1 that is then mirrored by transistors M8, M9 to be larger than I2 to pull up gate voltage VG7 to VDDINT. When this occurs, VGS of M7 is 0 and transistor M7 is turned off so that the internal functional circuitry is protected from a positive overvoltage.

In another example, VDDINT may be sensed by a more accurate comparator and thereby turn off M7 when VDDINT>VDDov, where VDDov is a threshold value selected to provide a maximum overvoltage protection value. Similarly, other types of sensing circuits may be used to sense an overvoltage condition on VDDPIN and thereby turnoff transistor M7 to protect functional circuitry 930.

System Example

Figure 10:
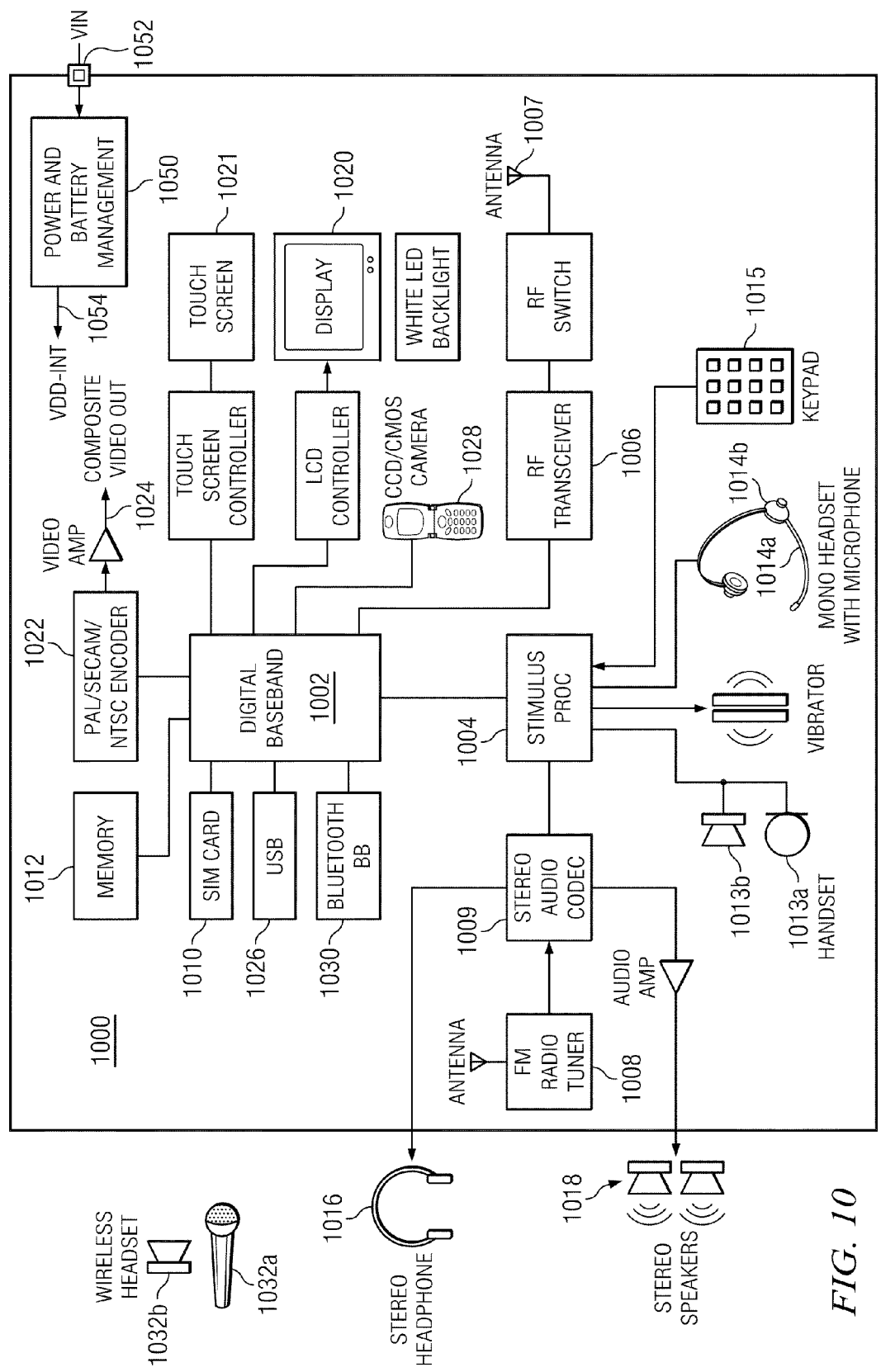
FIG. 10 is a block diagram of an exemplary system that includes the protection circuit of FIG. 3.

FIG. 10 is a block diagram of an exemplary mobile cellular phone 1000 that includes an embodiment of the present invention. Digital baseband (DBB) unit 1002 may include a digital processing processor system (DSP) that includes embedded memory and security features. Stimulus Processing (SP) unit 1004 receives a voice data stream from handset microphone 1013*a* and sends a voice data stream to handset mono speaker 1013*b*. SP unit 1004 also receives a voice data stream from microphone 1014*a* and sends a voice data stream to mono headset 1014*b*. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 is a digital radio processor and includes a receiver for receiving a stream of coded data frames from a cellular base station via antenna 1007 and a transmitter for transmitting a stream of coded data frames to the cellular base station via antenna 1007. RF transceiver 1006 is coupled to DBB 1002 which provides processing of the frames of encoded data being received and transmitted by cell phone 1000.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032*a* and headset 1032*b* for sending and receiving voice data. DBB 1002 can also be connected to display 1020 and can send information to it for interaction with a user of the mobile UE 1000 during a call process. Touch screen 1021 may be connected to DBB 1002 for haptic feedback. Display 1020 may also display pictures received from the network, from a local camera 1028, or from other sources such as USB 1026. DBB 1002 may also send a video stream to display 1020 that is received from various sources such as the cellular network via RF transceiver 1006 or camera 1028. DBB 1002 may also send a video stream to an external video display unit via encoder 1022 over composite output terminal 1024. Encoder unit 1022 can provide encoding according to PAL/SECAM/NTSC video standards. In some embodiments, audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc.

Battery and power management circuit 1050 includes an embodiment of reverse protection circuit 300, as described above, that is connected to voltage input connector 1052. Power management circuitry 1050 controls charging of an internal battery and provides VDD power 1054 to the other devices and integrated circuits within cell phone 1000. As described in more detail above, if a battery charger is connected incorrectly to terminal 1052, then the biasing circuit of the protection circuit within circuitry 1050 will cause a protection transistor to turn off when a negative supply voltage is coupled to the voltage supply terminal and thereby protect the circuitry within cell phone 1000. The biasing circuitry is configured to cause the protection transistor to turn on in a low impedance manner when a positive supply voltage is coupled to the voltage supply terminal and thereby provide normal positive supply voltage to the components of handset 1000. A reverse voltage tolerant ESD circuit, as described in more detail above, may also be coupled to input voltage terminal 1052.

Other Embodiments

This document discloses a new scheme for power supply pin circuits with low on-impedance, a large range of power supply voltages, reverse connection protection and ESD protection. It can be implemented on-chip together with core circuits. It can also be manufactured to be a catalog component for power supply pins that need reverse connection protection. It can be included in a design library for use in custom designed circuits, such as application specific integrated circuits (ASIC).

An embodiment of the invention may include a reverse voltage protection circuit to protect core logic within a system that is powered by a battery. This will protect against damage if the battery is inserted or otherwise connected backwards. The system may also include a second reverse voltage protection circuit between the battery and a connection point for a battery charger. This second voltage protection circuit will protect against damage to the battery and also to the core logic when an external power source such as a battery charger is connected backwards.

Embodiments of the protection circuits and methods described herein may be provided on any of several types of digital and/or analog systems: digital signal processors (DSPs), general purpose programmable processors, application specific circuits, or systems on a chip (SoC) such as combinations of a DSP and a reduced instruction set (RISC) processor together with various specialized accelerators.

An embodiment of the protection circuit described herein may be used to protect pins or pads of an IC that are not power pins, but carry digital or analog signals. For such applications, a reverse voltage protection circuit such as circuit 310 may be used without additional ESD circuit 320.

Figure 2A:
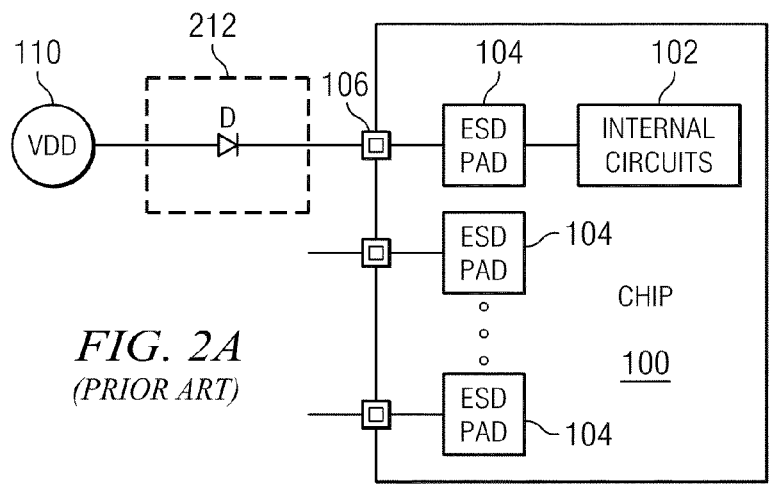
FIGS. 2A and 2B are schematics of other prior art voltage protection circuits.
Figure 2B:
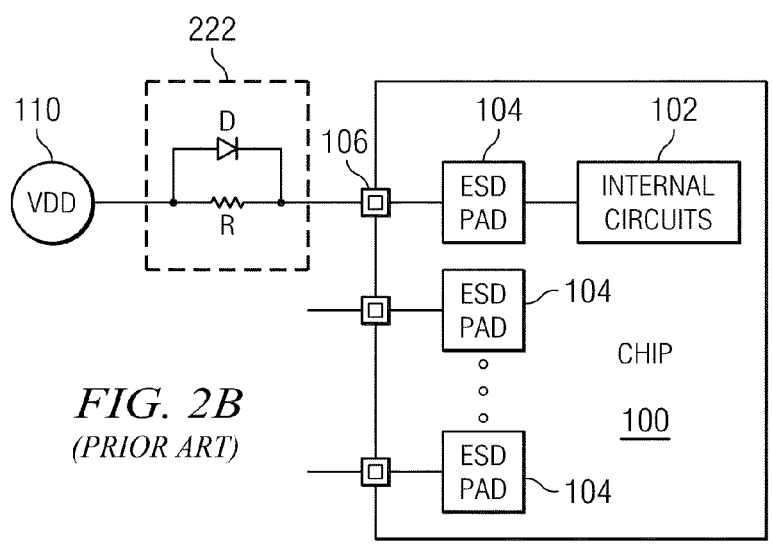
Figure 3:
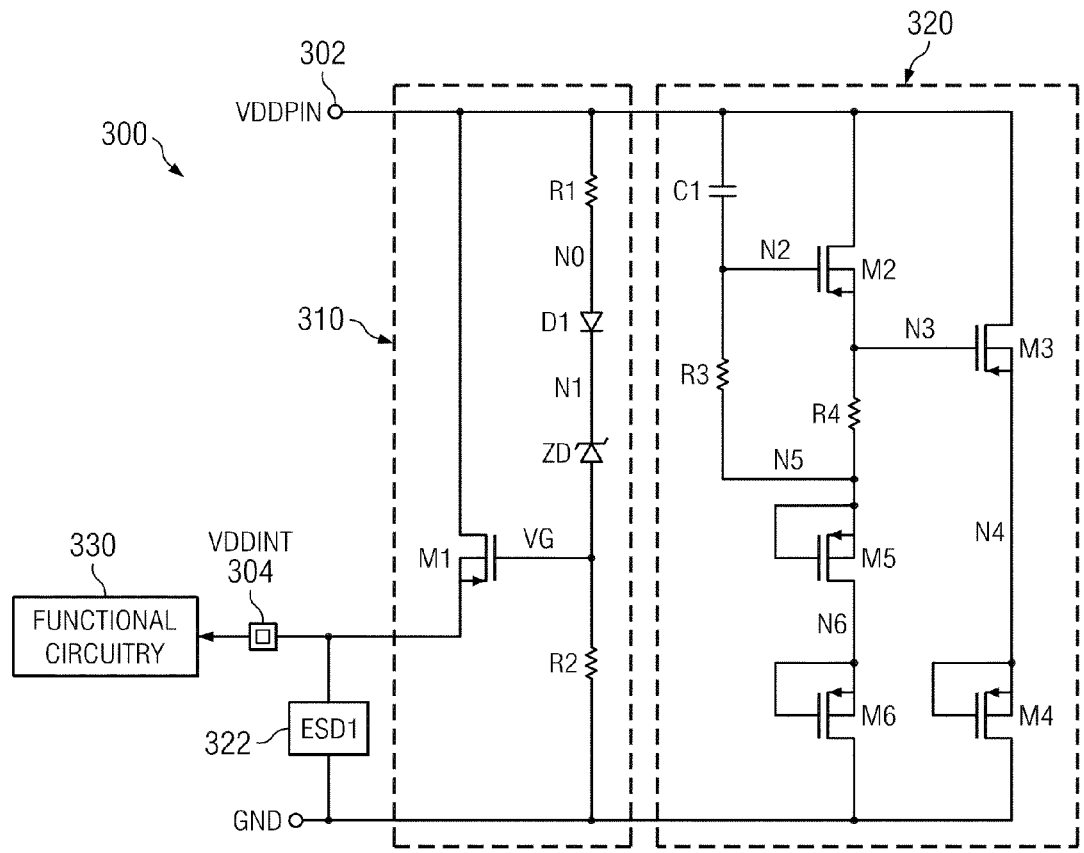
FIG. 3 is a schematic of an improved voltage protection circuit.

In another embodiment of the invention, a reverse voltage tolerant ESD circuit such as circuit 320 may be coupled to an IC pin or pad that uses a different type of reverse voltage protection circuit, such as illustrated in FIG. 1 or FIG. 2, for example.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the discussion and in the claims, the terms "including" and "comprising" are used in an open-ended fashion, and thus should be interpreted to mean "including, but not limited to . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

It is therefore contemplated that the appended claims will cover any such modifications of the embodiments as fall within the true scope and spirit of the invention.

What is claimed is:

1. An integrated circuit, comprising a voltage protection circuit, wherein the voltage protection circuit comprises:
    a protection transistor coupled between a voltage supply pin of the integrated circuit and a voltage output terminal of the integrated circuit; and
    a biasing circuitry coupled to a control node of the protection transistor, the biasing circuitry configured to cause the protection transistor to turn on to form a low impedance path between the voltage supply pin and the voltage output terminal when a positive supply voltage is coupled to the voltage supply terminal and to cause the protection transistor to turn off when a negative supply voltage is coupled to the voltage supply terminal, wherein Vgs of the protection transistor is maintained within a safe limit independent of the Vds applied thereto.

2. The integrated circuit of claim 1, wherein the protection transistor is a PMOS transistor, and the control node is a gate of the PMOS transistor.

3. The integrated circuit of claim 2, wherein the PMOS protection transistor has a gate width to length ratio of at least approximately 10,000.

4. The integrated circuit of claim 1, further comprising a functional circuitry connected to the voltage output terminal.

5. The integrated circuit of claim 1, further comprising an electro-static discharge (ESD) protection circuit connected between the voltage supply pin and a reference node, wherein the ESD protection circuit is configured to conduct a negative static discharge current for period of time, and to not conduct a negative current continuously.

6. The integrated circuit of claim 5, wherein the ESD circuit comprises one or more conduction transistors configured to conduct the negative static discharge current, and a timing circuit coupled to a control node of the one or more conduction transistors, wherein the timing circuit is configured to turn off the conduction transistors after the period of time.

7. The integrated circuit of claim 5, further comprising a second ESD circuit connected between the voltage output terminal and the reference node, the second ESD circuit configured to conduct a positive static discharge current.

8. The integrated circuit of claim 1, further comprising an over-voltage protection transistor coupled between a voltage supply pin of the integrated circuit and a voltage output terminal of the integrated circuit; and a voltage level sensing circuit connected to a control node of the over-voltage protection transistor, wherein the voltage level sensing circuit is configured to cause the over-voltage protection transistor to turn off when the positive supply voltage exceeds a defined voltage level.

9. A digital system, comprising:
    an integrated circuit having a voltage protection circuit, wherein the voltage protection circuit comprises:
    a protection transistor coupled between a voltage supply pin of the integrated circuit and a voltage output terminal of the integrated circuit; and
    biasing circuitry coupled to a control node of the protection transistor, the biasing circuitry configured to cause the protection transistor to turn on to form a low impedance path between the voltage supply pin and the voltage output terminal when a positive supply voltage is coupled to the voltage supply terminal and to cause the protection transistor to turn off when a negative supply voltage is coupled to the voltage supply terminal wherein Vgs of the protection transistor is maintained within a safe limit independent of the Vds applied thereto; and
    a functional circuitry connected to the voltage output terminal.

10. The digital system of claim 9 being a cellular handset, wherein the functional circuitry is configured to perform audio call processing.

11. The digital system of claim 9, further comprising an electro-static discharge (ESD) protection circuit connected between the voltage supply pin and a reference node, wherein the ESD protection circuit is configured to conduct a negative static discharge current for period of time, and to not conduct a negative current continuously.

12. The integrated circuit of claim 11, wherein the ESD circuit comprises one or more conduction transistors configured to conduct the negative static discharge current, and a timing circuit coupled to a control node of the one or more conduction transistors, wherein the timing circuit is configured to turn off the conduction transistors after the period of time.

13. The integrated circuit of claim 11, further comprising a second ESD circuit connected between the voltage output terminal and the reference node, the second ESD circuit configured to conduct a positive static discharge current.

14. An electronic system, comprising:
    an integrated circuit having a voltage protection circuit coupled between a voltage supply pin of the integrated circuit and a voltage output terminal of the integrated circuit, wherein the voltage protection circuit comprises:
    a protection transistor coupled between a voltage supply pin of the integrated circuit and a voltage output terminal of the integrated circuit; and
    biasing circuitry coupled to a control node of the protection transistor, the biasing circuitry configured to cause the protection transistor to turn on to form a low impedance path between the voltage supply pin and the voltage output terminal when a positive supply voltage is coupled to the voltage supply terminal and to cause the protection transistor to turn off when a negative supply voltage is coupled to the voltage supply terminal wherein Vgs of the protection transistor is maintained within a safe limit independent of the Vds applied thereto;
    a functional circuitry connected to the voltage output terminal; and
    an electro-static discharge (ESD) protection circuit connected between the voltage supply pin and a reference node, wherein the ESD protection circuit is configured to conduct a negative static discharge current for period of time, and to not conduct a negative current continuously.

15. The electronic system of claim 14, wherein the ESD circuit comprises one or more conduction transistors configured to conduct the negative static discharge current, and a timing circuit coupled to a control node of the one or more conduction transistors, wherein the timing circuit is configured to turn off the conduction transistors after the period of time.

16. The electronic system of claim 15, further comprising a second ESD circuit connected between the voltage output terminal and the reference node, the second ESD circuit configured to conduct a positive static discharge current.

17. The electronic system of claim 14, wherein the voltage protection circuit comprises:
   a protection transistor coupled between a voltage supply pin of the integrated circuit and a voltage output terminal of the integrated circuit; and
   biasing circuitry coupled to a control node of the protection transistor, the biasing circuitry configured to cause the protection transistor to turn on to form a low impedance path between the voltage supply pin and the voltage output terminal when a positive supply voltage is coupled to the voltage supply terminal and to cause the protection transistor to turn off when a negative supply voltage is coupled to the voltage supply terminal.

18. An integrated circuit, comprising a voltage protection circuit, wherein the voltage protection circuit comprises:
   a protection transistor coupled between a voltage supply pin of the integrated circuit and a voltage output terminal of the integrated circuit; and
   biasing circuitry coupled to a control node of the protection transistor, the biasing circuitry configured to cause the protection transistor to turn on to form a low impedance path between the voltage supply pin and the voltage output terminal when a positive supply voltage is coupled to the voltage supply terminal and to cause the protection transistor to turn off when a negative supply voltage is coupled to the voltage supply terminal, further comprising an electro-static discharge (ESD) protection circuit connected between the voltage supply pin and a reference node, wherein the ESD protection circuit is configured to conduct a negative static discharge current for period of time, and to not conduct a negative current continuously.

\* \* \* \* \*